United States Patent [19]

Kawai et al.

[11] Patent Number: 4,856,473
[45] Date of Patent: Aug. 15, 1989

[54] INTERNAL COMBUSTION ENGINE WITH MULTIPLE INTAKE VALVES AND EGR ARRANGEMENT

[75] Inventors: Taiyo Kawai; Norihisa Nakagawa; Shin-ichi Sano, all of Susono, Japan

[73] Assignee: Toyota Jidosha Kabushiki Kaisha, Aichi, Japan

[21] Appl. No.: 232,211

[22] Filed: Aug. 15, 1988

[30] Foreign Application Priority Data

Aug. 25, 1987 [JP] Japan ............... 62-127988[U]
Dec. 9, 1987 [JP] Japan ............... 62-186400[U]

[51] Int. Cl.$^4$ ............................................. F02B 31/02
[52] U.S. Cl. ................................. 123/308; 123/570; 123/52 M
[58] Field of Search ............... 123/308, 432, 570, 568, 123/52 M

[56] References Cited

U.S. PATENT DOCUMENTS

| 4,318,380 | 3/1982 | Matsumoto | 123/432 |
| 4,470,391 | 9/1984 | Ishida | 123/308 |
| 4,570,590 | 2/1986 | Kawai et al. | 123/308 |

FOREIGN PATENT DOCUMENTS 58-28511  2/1983 Japan .
59-90717  5/1984 Japan .
61-122362 8/1986 Japan .
61-126048 8/1986 Japan .
61-110837 7/1987 Japan .

*Primary Examiner*—E. Rollins Cross
*Attorney, Agent, or Firm*—Oliff & Berridge

[57] ABSTRACT

An internal combustion engine having two intake valves arranged in respective intake passages for each cylinder, wherein, a first intake passage is arranged to cause a swirl of intake air in the combustion chamber and a fuel injector is arranged in this intake passage, and a flow control valve is arranged in the second intake passage to close same when the engine load is low. An EGR passage is provided with an outlet in the second intake passage at a position between the second intake valve and the flow control valve, and the EGR gas is thus delivered to a volume enclosed in the second intake passage between the second intake valve and the flow control valve and remains there while these valves are closed. Then, when the second intake valve is open, the EGR gas slowly flows into the combustion chamber and floats toward and is collected at the upper region in the combustion chamber, while fuel flows smoothly into the combustion chamber, together with intake air, through the first intake passage.

9 Claims, 6 Drawing Sheets

INTERNAL COMBUSTION ENGINE WITH MULTIPLE INTAKE VALVES AND EGR ARRANGEMENT

BACKGROUND OF THE INVENTION

1. Field of the Invention

The present invention relates to an internal combustion engine with multiple intake valves for each cylinder and an improved exhaust gas recirculation (EGR) arrangement.

2. Description of the Related Art

In a known internal combustion engine, two intake valves are arranged in respective intake passages for each cylinder, and it is possible to improve the performance of the engine by constituting one of the intake passages by a helically shaped intake port and the other by a straight shaped intake port. For example, Japanese Unexamined Utility Model Publication No. 61-122362 discloses an internal combustion engine with multiple intake valves in which a flow control valve is arranged in the straight shaped intake port to close same to generate a strong swirl in the combustion chamber by a flow of intake air through the helically shaped intake port when the load of the engine is low. A fuel injector is arranged in the straight shaped intake port between the intake valve and the flow control valve, and an EGR passage is connected to this straight shaped intake port between the intake valve and the flow control valve. This arrangement is adapted to stratify fuel so that a richer mixture is distributed near the top of the combustion chamber and a leaner mixture near the top of the piston.

In this arrangement, the stratification of fuel-rich mixture near the top of the combustion chamber is established because a dead volume is formed in the straight shaped intake port between the intake valve and the flow control valve when these valves are closed. Fuel stays in that dead volume in the straight shaped intake port, is mixed with the EGR gas when the flow control valve and the intake valve are closed, and is then carried slowly by the flow of EGR gas into the combustion chamber when the intake valve is open while the flow control valve is closed. In this manner, fuel is supplied slowly into the combustion chamber, to generate a stratification of a fuel-rich mixture and the EGR gas near the top of the combustion chamber, with less interference by intake air flowing through the helically shaped intake port. This stratification is advantageous in effecting a good combustion at a low engine load even with a leaner air fuel ratio. Nevertheless, in this arrangement, fuel tends to be deposited on the bottom wall of the straight shaped intake port, since the actual flow of EGR gas is small, causing a delayed acceleration response when the flow control valve is open due to a change of the engine load, in which an increased amount of fuel must be carried by the intake air into the combustion chamber but the speed of the intake air instantaneously drops to fill the dead volume when the flow control valve is open.

Japanese Unexamined Utility Model Publication No. 61-126048 discloses a similar type of an internal combustion engine with multiple intake valves arranged in respective intake ports and a flow control valve. The second intake valve is open later than the first intake valve. In this case, two separate surge tanks are provided, with the first helically shaped intake port of each cylinder being connected to the first surge tank and the second straight shaped intake port of each cylinder being connected to the second surge tank. The flow control valve is arranged in the second surge tank to close the second straight shaped intake ports of all cylinders together, and a dead volume is constituted on the downstream side of the flow control valve, as in the previous case. Also, a fuel injector is provided in the second straight shaped intake port and an EGR passage is connected to the second surge tank. A leak passage is provided in the second surge tank, bypassing the flow control valve to allow a small amount of intake air to normally flow even when the flow control valve is closed, and this small amount of intake air, in addition to the EGR gas, carries fuel from the dead volume into the combustion chamber to generate a stratification of a fuel-rich mixture near the top of the combustion chamber when the flow control valve is closed, as in the previous case. Nevertheless, a similar problem of a delayed acceleration response arises in this case also.

Japanese Unexamined Utility Model Publication No. 61-110837 discloses an internal combustion engine with multiple intake valves arranged in respective intake ports. A flow control valve is arranged in the second intake port and a fuel injector is arranged in the first normally open intake port. In this case, the valve timing of the first and second intake valves is varied; i.e., the first intake valve is closed before the second intake valve, so that the compression ratio is increased by the earlier closing first intake valve when the flow control valve is closed at an engine low load. The compression ratio is reduced, but the inertia supercharging effect is increased, by the later closing second intake valve when the flow control valve is open at a high engine load.

SUMMARY OF THE INVENTION

An object of the present invention is to provide an internal combustion engine with multiple intake valves, in which fuel is smoothly supplied into the engine and an EGR gas is supplied so as to collect near the top of a combustion chamber to thereby reduce pollutive elements in the exhaust gas.

According to the present invention, there is provided an internal combustion engine comprising a cylinder block and a cylinder head secured thereto to define cylinders therein, a piston being inserted in each of the cylinders to define a combustion chamber thereabove; first and second intake passage means for each cylinder in communication with the combustion chamber, the first intake passage means being arranged such that a swirl can be generated in the combustion chamber by the intake air introduced into the combustion chamber through the first intake passage means; first and second intake valves arranged in the first and second intake passage means, respectively, and operating in synchronization with a rotation of the engine crankshaft; exhaust passage means in communication with the combustion chamber, with an exhaust valve arranged therein; fuel supply means for supplying fuel into the first intake passage means; a flow control valve arranged in the second intake passage means upstream of the second intake valve and operating in response to running conditions of the engine; and an exhaust gas recirculating means including an exhaust gas recirculating passage and an exhaust gas recirculating control valve arranged therein, the exhaust gas recirculating passage having an inlet at the exhaust passage means and an outlet at the second intake passage means between the second intake valve and the flow control valve.

Preferably, the opening timings of the first and second intake valves are synchronized with the rotation of the crankshaft of the engine, respectively, in such a manner that the second intake valve opens after the first intake valve is open.

BRIEF DESCRIPTION OF THE DRAWINGS

The other features and objects of the present invention will become apparent from the following description of the preferred embodiments with reference to the accompanying drawings, in which.

DESCRIPTION OF THE PREFERRED EMBODIMENTS

Figure 1:
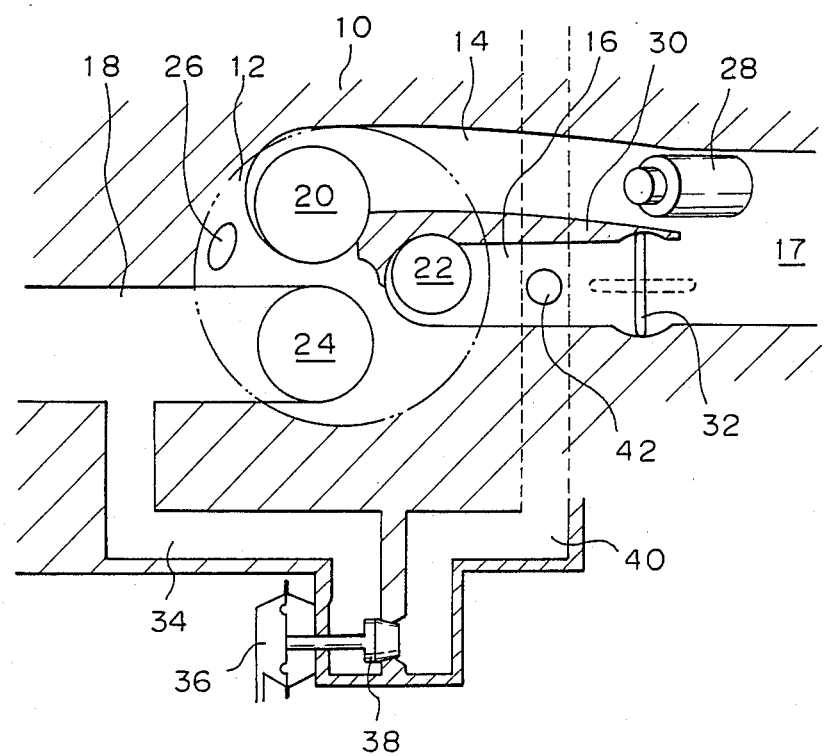
FIG. 1 is a sectional view of a portion of an internal combustion engine according to the first embodiment of the present invention.

Referring to FIG. 1, the internal combustion engine comprises a cylinder block (not shown) and a cylinder head 10 secured thereto to define a plurality of cylinders. A piston (not shown) is reciprocably inserted in each cylinder and a combustion chamber 12 is defined above the piston. As will be apparent, FIG. 1 shows only one cylinder of the cylinder head 10, to show the combustion chamber 12 in detail.

A first intake port 14 and a second intake port 16 are provided in the cylinder head 10 and in communication with the combustion chamber 12, respectively. An exhaust port 18 is also provided in the cylinder head 10 and in communication with the combustion chamber 12. The first intake port 14 is helically shaped so that a swirl can be generated in the combustion chamber 12 around the axis of the cylinder by the intake air passing through the first intake port 14. The second intake port 16 is a straight shaped port into which a large amount of intake air can be drawn with a small flow resistance. First and second intake valves 20 and 22 and an exhaust valve 24 are arranged in the first and second intake ports 14 and 16 and the exhaust port 18, respectively, adjacent to the combustion chamber 12. These first and second intake valves 20 and 22 and exhaust valve 24 are driven by known cams connected to the engine and operating in synchronization with the rotation of the crankshaft of the engine. An ignition plug 26 is arranged in each combustion chamber 12, and a fuel injector 28 is arranged in the first intake port 14.

The first and second intake ports 14 and 16 are branched from a common inlet port 17 by a separating wall 30. The separating wall 30 extends from a branch end upstream of the first and second intake valves 20 and 22, to a central region of the cylinder head 10. The common inlet port 17 has a large size and thus a small flow resistance, and therefore, allows a large amount of intake air to flow therethrough at a high engine load.

Figure 10:
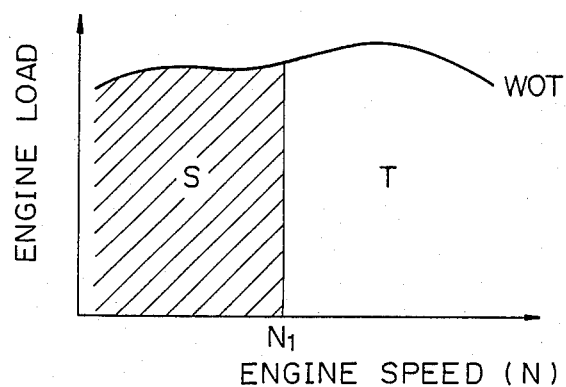
FIG. 10 is a view illustrating an area for opening the flow control valve and for supplying the EGR gas.
Figure 11:
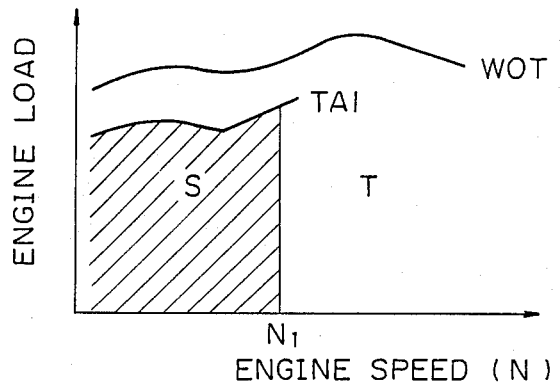
FIG. 11 is view illustrating a modified example of FIG. 10.

A flow control valve 32 is arranged in the second intake port 16 at a position near the upstream end of the separating wall 30. The flow control valve 32 is connected to an actuator (not shown) and operates in response to running conditions of the engine. Typically, the flow control valve 32 is closed when the engine load is low, and opened when the engine load is high. Alternatively, for example, the flow control valve 32 is closed when the rotational speed of the engine N is smaller than a predetermined value $N_1$, as shown in the range S in FIG. 10, and open when the rotational speed of the engine N is greater than the value $N_1$, as shown in the range T in FIG. 10. The symbol WOT denotes a full load range of the engine in which the throttle valve is fully open. On the other hand, the flow control valve 32 is closed when the rotational speed of the engine N is smaller than a predetermined value $N_1$ and the engine load is smaller than a predetermined value TA1, as shown in FIG. 11. Therefore, intake air is introduced into the combustion chamber 12 only through the first intake port 14 when the flow control valve 32 is closed at low engine load and a strong swirl is generated in the combustion chamber 12 to improve the combustion. When the flow control valve 32 is open at high engine load, a large amount of intake air is introduced into the combustion chamber 12 through both the first and second intake ports 14 and 16, to obtain a high engine output power.

Also provided is an exhaust gas recirculating (EGR) passage 34 having a gas inlet at the exhaust port 18 and a gas outlet 42 at the second intake port 16 between the second intake valve 22 and the flow control valve 32. Preferably, the EGR passage 34 is connected to an exhaust manifold (not shown in FIG. 1). An EGR control valve 38 is arranged in the EGR passage 34 and connected to a vacuum operated actuator 36 to exert a precise control of the flow of the EGR gas in response to the load and speed of the engine. Note, the EGR control valve 38 closes the EGR passage 34 when the flow control valve 32 is closed.

In the embodiment shown in FIG. 1, the EGR passage 34 comprises a common delivery passage 40 on the downstream side of the EGR control valve 38. This common delivery passage 40 extends across the second intake ports 16 of all of the cylinders, and is provided with gas outlets 42 at the second intake ports 16, respectively. Each of these gas outlets 42 is open in the second intake port 16 at a position between the second intake valve 22 and the flow control valve 32, and the EGR gas is supplied in a dead volume on the downstream side of the flow control valve 32 when the flow control valve 32 is closed. This dead volume is relatively narrow, and thus the amount of the EGR gas in this enclosed dead volume is small. Therefore, when the flow control valve 32 is next opened in response to an acceleration operation, intake air can quickly displace the remaining EGR gas in that dead volume, and thus improve the acceleration response without influence by the remaining EGR gas. The sectional area of the common delivery passage 40 is made small, to minimize the remaining EGR gas in that passage portion and thus avoid any influence by the remaining EGR gas during acceleration, but is large enough to allow a necessary maximum flow of the EGR gas therethrough when the EGR control valve 38 is open and the flow control valve 32 is closed.

With this arrangement, when the engine load is low, the flow control valve 32 is closed and the EGR control valve 38 is open to the controlled extent, and thus the intake air is introduced into the combustion chamber 12 when the first intake valve 20 is open and generates a swirl in the combustion chamber 12. Fuel is injected by the fuel injector 28 and carried by the intake air flowing in the first intake port 14 into the combustion chamber 12. On the other hand, very little intake air flows through the second intake port 16, since the flow control valve 32 is closed, and thus the EGR gas enters the enclosed dead volume in the second intake port 16 and then slowly flows into the combustion chamber 12 when the second intake valve 22 is open. This EGR gas is not substantially diffused in the mixture swirling in the combustion chamber 12 and floats upward to collect at the upper region in the combustion chamber 12, and accordingly, the EGR gas is stratified at the upper region in the combustion chamber 12. The stratification of the EGR gas is further completed by the characteristic of the valve lift timing of the first and second intake valves 20 and 22 described as follows.

Figure 2:
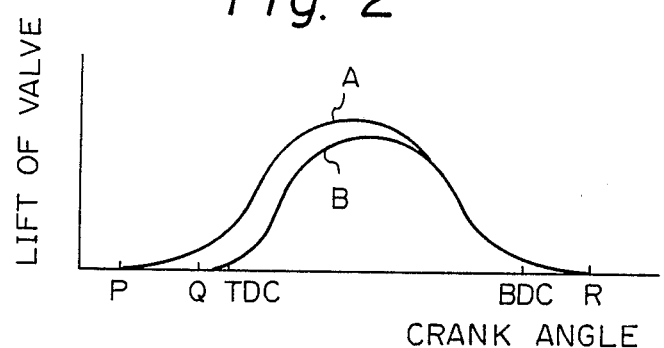
FIG. 2 is a diagram of a lift of intake valves in FIG. 1.

Referring to FIG. 2, curve A shows a valve lift of the first intake valve 20 arranged in the first helically shaped intake port 14 in relation to the crank angles (CA) of the engine, and curve B shows a valve lift of the second intake valve 22 arranged in the second straight shaped intake port 16. The valve timing of the first intake valve 20 is set so that the first intake valve 20 opens at a point P slightly before the top dead center (TDC) of the suction stroke and closes at a point R slightly after the bottom dead center (BDC), the first intake valve 20 being open, for example, through a rotation of the crankshaft of 120 degrees. On the other hand, the valve timing of the second intake valve 22 is set so that the second intake valve 22 opens at a point Q, later than the opening point P of the first intake valve 20, and closes at the point R.

Therefore, under an operating condition of the engine in which the EGR control valve 38 is open, the first intake valve 20 is first open to start the suction of intake air into the combustion chamber 12, and thereafter, the second intake valve 22 is open to start the suction of the EGR gas into the combustion chamber 12. Accordingly, a swirl is formed in the intake air and the swirling intake air is charged into the combustion chamber 12 toward the bottom thereof (toward the top of the piston), followed by a charge of the EGR gas which stays at the upper region in the combustion chamber 12, whereat the ignition plug 26 is located. Accordingly, the EGR gas is stratifies and collected at the upper region in the combustion chamber 12, and this distribution is maintained by the intake air swirl until the compression stroke of the engine. Therefore, the purification of the exhaust gas is improved because the EGR gas is supplied to the upper region of the combustion chamber 12 near the ignition plug 26, and concentrated thereat, where the combustion temperature is high and a large amount of nitrogen oxide (NOx) is normally generated. In addition, the EGR gas is diluted at the lower region in the combustion chamber 12 near the piston, and thus it is possible to minimize misfires caused by the EGR gas and to select a leaner air fuel ratio. This leads to an improvement of both the purification of the exhaust gas and the fuel economy.

Also, since the fuel injector 28 is arranged in the first intake port 14 through which the EGR gas does not flow, fuel can flow smoothly into the combustion chamber 12, and will not be disturbed by any unevenness, such as a gas outlet 42 of the EGR gas. Also, the EGR gas does not impinge on the fuel injector 28, and therefore, particles in the EGR gas do not stick to the fuel injector 28. Furthermore, since the EGR gas is not difused by atomization or vaporization of the injected fuel into the suctioned air, stratification and collection of the EGR gas at the upper region in the combustion chamber 12 can be easily performed.

Figure 3:
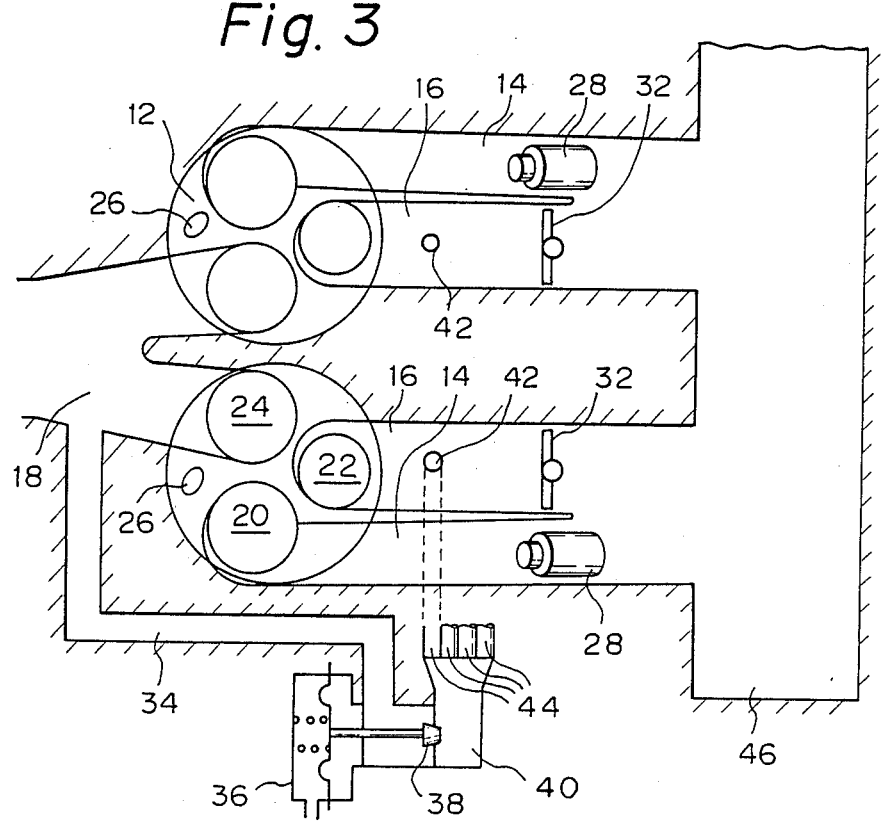
FIG. 3 is a schematical view of a portion of an internal combustion engine according to the second embodiment of the present invention.
Figure 4:
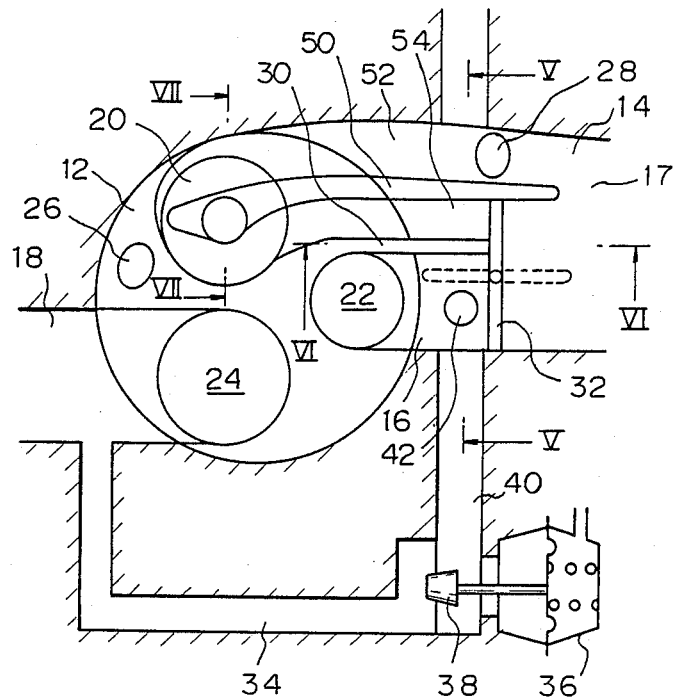
FIG. 4 is a schematical view of a portion of an internal combustion engine according to the third embodiment of the present invention.

FIG. 3 shows the second embodiment of the present invention. Note, similar elements are represented by the same reference numerals throughout the Figures, and thus a repeated explanation thereof is omitted. In this embodiment, a plurality of branch EGR passages 44 are formed by relatively narrow pipes and extend from the common delivery passage 40 to respective second intake ports 16 of all cylinders. Each branch EGR passage 44 is provided with a gas outlet 42 at the second intake port 16 at a position between the second intake valve 22 and the flow control valve 32. Accordingly, the volume of the EGR gas passage downstream of the flow control valve 32 is narrowed, to thereby improve a response of the flow of EGR gas upon acceleration and deceleration of the engine.

Also, in the arrangement shown in FIG. 1, interference of the intake air occurs between the cylinders via the EGR passage when the flow control valve 32 is open, i.e., the intake air flow in one of the second intake ports 16 is influenced by the pulsation of the intake air flow in another second intake port 16, since the gas outlets 42 of all cylinders are normally open and thus the second intake ports 16 of all cylinders are mutually communicated by the common delivery passage 40. The narrow branch EGR passages 44 in FIG. 3 reduce this mutual interference of the intake air flows and such interference or influence of the pulsation of the intake air flows can be equalized among the cylinders by equalizing the lengths of the narrow branch EGR passages 44. Also, if the distance from the surge tank 46 to gas outlets 42 are equal, the volume of the delivery passage 40 can be regarded as an additional tank when the EGR valve 38 is closed, thus constituting a variable intake system in which the effective length of the intake pipes is varied to improve the volumetric efficiency under a high engine load when the flow control valve 32 is open.

FIGS. 4 to 7 show the third embodiment of the present invention. In this embodiment, first and second intake ports 14 and 16 branched from a common inlet port 17 are also arranged in the cylinder head 10, and a first separating wall 30 is extended between the first and second intake ports 14 and 16 to branch these ports upstream of the intake air flow. A gas outlet 42 of the EGR gas passage 40 is arranged in the second intake port 16.

Figure 5:
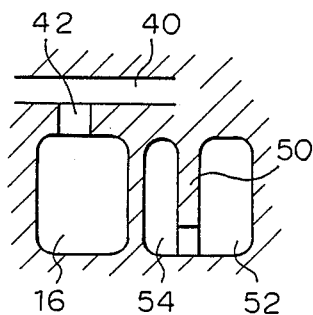
FIG. 5 is sectional view of the engine of FIG. 4, taken along the line V—V in FIG. 4.
Figure 6:
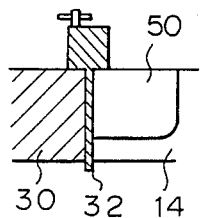
FIG. 6 is sectional view of the engine of FIG. 4, taken along the line VI—VI in FIG. 4.
Figure 7:
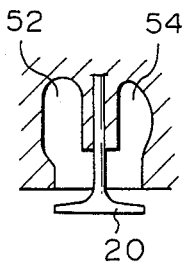
FIG. 7 is sectional view of the engine of FIG. 4, taken along the line VII—VII in FIG. 4.

A second separating wall 50 is provided in the first intake port 14 and is extended therein along a central axis thereof to separate the first intake port 14 into third and fourth intake subports 52 and 54. The upstream end of the second separating wall 50 is upstream of the upstream end of the first separating wall 30 and terminates at a position near the valve stem guide of the first intake valve 20 to allow the fourth intake subport 54 to merge into the turning end portion of the third intake subport 52, whereby the third and fourth intake subports 52 and 54 are both controlled by the first intake valve 20, as shown in FIG. 7. The second separating wall 50 is extended from the top wall of the first intake port 14 to a position above a bottom wall thereof, as shown in FIGS. 5 and 6, to allow communication between the third and fourth intake subports 52 and 54 at the bottom portion of the first intake port 14.

The flow control valve 32 is arranged in the second intake port 16 near to the upstream end of the first separating wall 30, in such a manner that the flow control valve 32 can simultaneously close or open both the second intake port 16 and the fourth intake subport 54.

In the third embodiment of the present invention, the flow of the EGR gas, intake air, and fuel can be controlled in the same way as in the previous embodiments. But in the third embodiment, the flow of the intake air is further improved in that the third intake subport 52 turns about the valve stem guide of the first intake valve 20 to generate a stronger swirl in the combustion chamber 12 when the flow control valve 32 closes the second intake port 16, and the fourth intake support 54 and the fourth intake subport 54 are opened together with the second intake port 16 by the flow control valve 32 to allow a charge of greater amount of intake air into the engine when the engine load is high, to provide a high engine power output.

Figure 8:
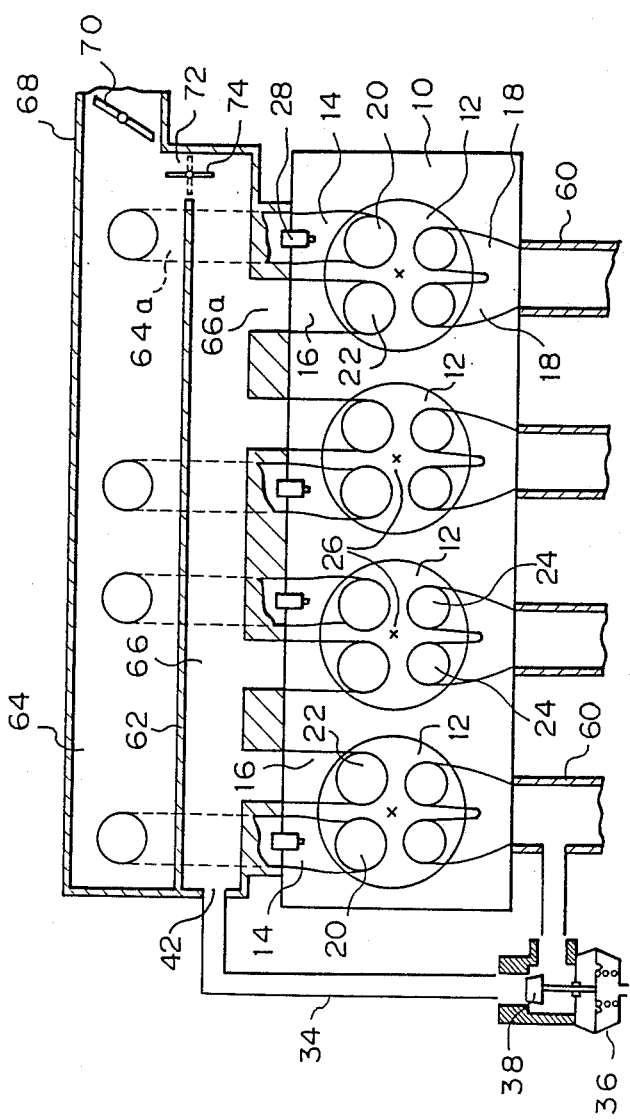
FIG. 8 is a schematical view of a portion of an internal combustion engine according to the fourth embodiment of the present invention.

FIG. 8 shows the fourth embodiment of the present invention. In this embodiment, a first helically shaped intake port 14 and a second straight shaped intake port 16 are also arranged independently in the cylinder head 10, but are not branched from a common inlet port 17 as in the previous embodiments: Instead, separate first and second surge tanks 64 and 66 with a separating wall 62 extending therebetween are provided. The first surge tank 64 has a first set of intake branch pipes 64a which are connected to the first intake ports 14, respectively, and the second surge tank 66 has a second set of intake branch pipes 66a which are connected to the second intake ports 16, respectively.

The first and second surge tanks 64 and 66 are merged on the upstream side thereof by a common intake pipe 68, and a throttle valve 70 mechanically connected to an accelerator pedal (not shown) is arranged in the common intake pipe 68. A flow control valve 74 is arranged in the second surge tank 66, preferably in an opening area 72 provided in the separating wall 62 at an end portion of the surge tanks 64 and 66 near the throttle valve 70. The flow control valve 74, similar to the flow control valve 32 in the previous embodiments, can be connected to an actuator and operated in response to running conditions of the engine. Typically, the flow control valve 74 is closed when the engine load is low, and opened when the engine load is high. A fuel injector 28 is arranged in the first intake port 14 connected to the first normally open surge tank 64. An EGR passage 34 with an EGR control valve is extended from an exhaust manifold 60 to the second surge tank 66 at a position downstream of the flow control valve 74, and therefore, the gas outlet 42 of the EGR passage 34 is arranged between the flow control valve 74 and second intake valve 22.

Figure 9:
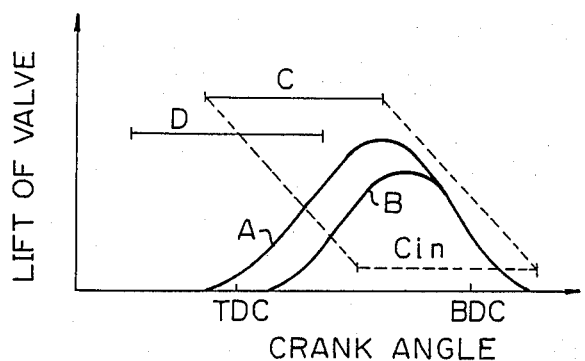
FIG. 9 is a diagram of a lift of intake valves and fuel injection time in FIG. 8.

FIG. 9 shows a valve lift of the first intake valve 20 (curve A) and a valve lift of the second intake valve 22 (curve B). Similar to FIG. 2, the second intake valve 22 opens later than the first intake valve 20. Further, in FIG. 9, a line C shows a fuel injection timing by which a fuel injection is started slightly before the opening of the first intake valve 20 but the actual inflow of fuel into the combustion engine 12 is delayed, as shown by the line C, due to a difference in the effects of inertia of the intake air and fuel, in which intake air just behind the first intake valve 20 first flows into the combustion chamber 12 when the first intake valve 20 is open and fuel is carried by the succeeding flow of intake air. Of course, the fuel injecting time period varies in accordance with the required amount of fuel, which is small at a low engine load and large at a high engine load. The fuel injecting time period shown in FIG. 9 is an example, and is that at a low engine load, and thus at a high engine load, it is necessary to start the fuel injection at an earlier timing and to lengthen the opening period of the fuel injector 28. In this case, the flow of intake air is sufficient to carry the necessary fuel, since the fuel injector 28 is arranged in the normally open first intake port 14, and thus the acceleration response is not affected, compared to the case in which the fuel injector 28 is arranged in the closable second intake port 16. Also, the fuel injection timing, as represented by the line C, is such that the inflow of fuel into the combustion chamber 12 is effected during a later period in the suction stroke of the engine, to allow the fuel to stay in the upper region of the combustion chamber 12 to form a stratification of the fuel, but this fuel injection can be varied if the stratification of fuel is not necessary. For example, the line D shows that the fuel injection timing is earlier than that shown by the line C, and thus the injected fuel is premixed with intake air in the first intake port 14 before the opening of the first intake valve 20, so that fuel is uniformly distributed in the combustion chamber 12. Although in the above description fuel is injected in each of the first intake ports 14 at the suction stroke thereof in synchronization with the rotation of the crankshaft of the engine, it is possible to inject fuel in all of the first intake ports 14 simultaneously, or it is possible to use a single injector or a carburetor.

Figure 12:
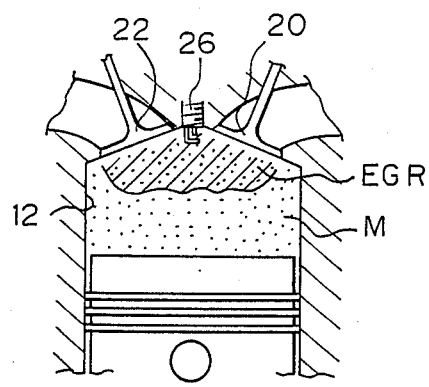
FIG. 12 is a view schematically illustrating a combustion when the EGR gas is supplied in the uniformly distributed mixture.

FIG. 12 schematically shows a combustion when the EGR gas (EGR) is supplied as a uniformly distributed mixture (established by the fuel injection shown by the line D is FIG. 9) when the flow control valve 74 is closed and the first intake valve 20 is first open to start the suction of intake air into the combustion chamber 12, and thereafter, the second intake valve 22 is open to start the suction of the EGR gas into the combustion chamber 12 to form a stratification of the EGR gas at the upper region in the combustion chamber 12, near to the ignition plug 26. In this case, the flow control valve 74 is closed so that intake air does not substantially flow through the second surge tank 66 and each second intake port 16, and therefore, the flow of the EGR gas is controlled by the EGR control valve 38 so that the EGR gas flows slowly into the combustion chamber 12 through the second surge tank 66 and each second intake port 16.

The swirl generated by intake air introduced through the first intake port 14 is affected by the flow from the second intake port 16 and may be abated if the flow from the second intake port 16 is strong. Nevertheless, the swirl can be maintained while the flow control valve 74 substantially closes the second surge tank 66, according to the present invention, which not only improves the combustion but also maintains the stratification of the EGR gas at the upper region of the combustion chamber 12. Also, in this arrangement, a variable intake system in which the effective length of the intake pipe is varied when the flow control valve 32 is open is constituted, to improve the volumetric efficiency under a high engine load.

The temperature of the combustion becomes higher at the upper region in the combustion chamber 12 near to the ignition plug 26, and the combustion is propagated therefrom to the lower region in the combustion chamber 12, near to the top of the piston. As the combustion is propagated toward the lower region of the combustion chamber 12, a possibility of an interruption of the combustion or an incomplete combustion may occur. Therefore, the stratification of the EGR gas at the upper region of the combustion chamber 12, where the temperature is usually higher, restrains the maximum temperature of the combustion to thereby reduce the emission of nitrogen oxide (NOx) pollution. The EGR gas is not significantly distributed at the lower region of the combustion chamber 12 and thus does not disturb the combustion at this region, thereby ensuring a stable combustion with a leaner air fuel ratio as a whole. The present invention is particularly suitable for use with a lean burn engine, to reduce the emission of nitrogen oxides (NOx) and ensure a stable combustion with a leaner air fuel ratio as a whole.

Figure 13:
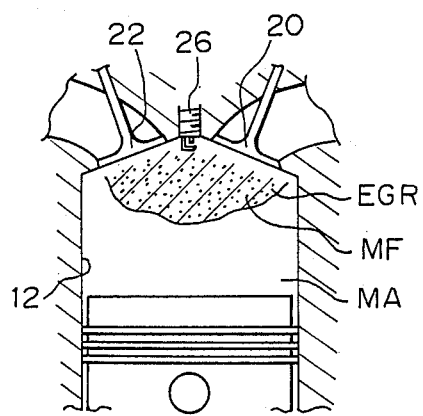
FIG. 13 is a view schematically illustrating a combustion when the EGR gas is supplied on the stratified mixture.

FIG. 13 schematically shows a combustion in which a stratification of fuel is established by the fuel injection shown by the line C in FIG. 9, as well as a stratification of the EGR gas. By introducing fuel into the combustion chamber 12 late in the intake stroke of the engine, a leaner mixture portion MA is formed at the lower region of the combustion chamber 12 and a fuel richer mixture portion MF is formed at the upper region of the combustion chamber 12 near the ignition plug 26. Also, the EGR gas is supplied in the fuel richer mixture portion MF at the upper region of the combustion chamber 12 near the ignition plug 26. This distribution can be maintained by the swirl of intake air so that a stable combustion can be secured with a leaner air fuel ratio as a whole, and the emissions of nitrogen oxides (NOx) can be reduced.

Figure 14:
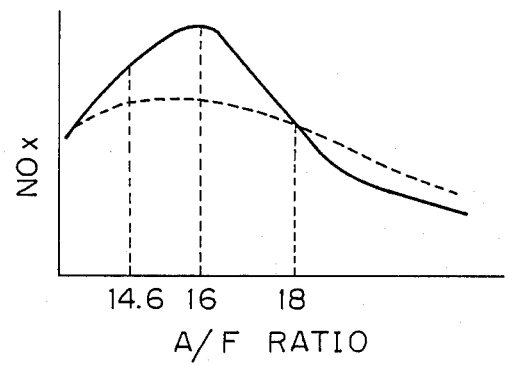
FIG. 14 is a graph of nitrogen oxides generated in relation to the air fuel ratio.

FIG. 14 shows the emission of nitrogen oxides (NOx) relative to the air fuel ratio, in which the emission of nitrogen oxides (NOx) in the case of a uniformly distributed mixture (FIG. 12) is represented by the solid line and peaks at an air fuel ratio of about 16 or 17, which is higher than the theoretical air fuel ratio of about 14.6. The emission of nitrogen oxides (NOx) in the case of a stratified lean burn engine (FIG. 13) is represented by the broken line and peaks at a similar air fuel ratio to that at which the peak occurs in the solid line. The peak in the broken line is smaller than that in the solid line, but the rate of change is reduced as the air fuel ratio becomes larger so that the value of the emission of nitrogen oxides (NOx) may be reversed. This is based on the fact that the air fuel ratio in the case of a stratified lean burn engine is a large (lean) value as a whole but richer mixture prevails at the upper region of the combustion chamber 12, and the value of the emission of nitrogen oxides (NOx) may be proportional to the temperature at this upper region of the combustion chamber 12. Therefore, it is possible to ensure a stable combustion with a leaner air fuel ratio as a whole, and to reduce the emission of nitrogen oxides (NOx), by supplying the stratification of the EGR gas in the fuel-richer mixture portion MF at the upper region of the combustion chamber 12, near to the ignition plug 26.

As described above, the fuel injector 26 is arranged to supply fuel into the first intake passage means (first intake port 14 and/or first surge tank 64) and the EGR passage 34 is provided with the gas outlet 42 at the second intake passage means (second intake port 16 and/or second surge tank 66), so that the fuel can be carried into the combustion chamber by the intake air passing through the first intake passage means and the EGR gas is not mixed with the intake air in the second intake passage, and thus the EGR gas is not cooled by the evaporation of the fuel. Therefore, a small amount of the EGR gas flows into the combustion chamber and is less affected by the centrifugal force of the swirl and remains at the upper central region of the combustion chamber to form a stratification of the EGR gas, resulting in a stable combustion and a reduction of the emissions of nitrogen oxides (NOx). Also, the volumetric efficiency can be improved over the whole operating range of the engine by changing the effective length of the intake pipe when the flow control valve is open.

We claim:

1. An internal combustion engine comprising:
   a cylinder block and a cylinder head secured thereto to define cylinders therein, a piston being inserted in each of said cylinders to define a combustion chamber thereabove;
   first and second intake passage means for each cylinder in communication with the combustion chamber, said first intake passage means being arranged such that a swirl is generated in the combustion chamber by intake air introduced into the combustion chamber through said first intake passage means;
   first and second intake valves arranged in said first and second intake passage means, respectively, and operating in synchronization with said engine;
   exhaust passage means in communication with the combustion chamber, with an exhaust valve arranged therein;
   fuel supply means for supplying fuel into said first intake passage means;
   a flow control valve arranged in said second intake passage means upstream of said second intake valve and operating in response to running conditions of said engine; and
   an exhaust gas recirculating means including an exhaust gas recirculating passage and an exhaust gas recirculating control valve arranged therein, said exhaust gas recirculating passage having an inlet at said exhaust passage means and an outlet arranged in said second intake passage means at a position between said second intake valve and said flow control valve.

2. An internal combustion engine according to claim 1, wherein said first and second intake valves have opening timings set in synchronization with a rotation of a crankshaft of said engine, respectively, so that said second intake valve opens later than said first intake valve.

3. An internal combustion engine according to claim 2, wherein said first and second intake passage means comprises first and second intake ports arranged in said cylinder head, respectively, said fuel supply means comprises a fuel injector arranged in said first intake port, and said outlet of said exhaust gas recirculating passage and said flow control valve are arranged in said second intake port.

4. An internal combustion engine according to claim 3, wherein said exhaust gas recirculating passage comprises a common delivery passage extending across said second intake ports of all cylinders and having outlets at said second intake ports, respectively.

5. An internal combustion engine according to claim 3, wherein said exhaust gas recirculating passage comprises a plurality of branch passages leading to said second intake ports of all cylinders, respectively.

6. An internal combustion engine according to claim 2, wherein said first and second intake passage means comprises first and second intake ports arranged in said cylinder head, respectively, and said cylinder head further comprises a common inlet port provided therein from which said first and second intake ports are branched, a first separating wall extending between said first and second intake ports and having a branch point at an upstream point of said intake pipe, and a second separating wall extending in said first intake port along a central axis thereof to separate said first intake port into third and fourth intake subports and having an upstream end located upstream of said upstream end of said first separating wall, said flow control valve being arranged in said second intake port at said upstream end of said first separating wall so that said flow control valve can simultaneously open or close both said second intake port and one of said third and fourth intake subports.

7. An internal combustion engine according to claim 6, wherein said second separating wall allows communication between said third and fourth intake subports at a bottom thereof.

8. An internal combustion engine according to claim 2, wherein said first and second intake passage means comprises first and second intake ports arranged in said cylinder head, respectively, and separate first and second surge tanks, said first intake port being connected to said first surge tank and said second intake port being connected to said second surge tank, and said flow control valve being arranged in said second surge tank so that said flow control valve can open or close said second intake passage means of all cylinders.

9. An internal combustion engine according to claim 8, wherein said second surge tank includes a connecting passage connected to said first surge tank, said flow control valve being arranged in said connecting passage.

* * * * *